Patented Sept. 23, 1930

1,776,423

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

NONHYGROSCOPIC SEED DISINFECTANT

No Drawing.   Application filed February 6, 1928.   Serial No. 252,430.

This invention relates to non-hygroscopic seed disinfectants which are adapted for use either in dust form or in aqueous solution, and pertains especially to non-hygroscopic powders containing mercurized phenols associated with an alkaline earth metal oxide or hydroxide, together with the alkali metal salt of an acid which forms a relatively insoluble salt with the alkaline earth.

In the U. S. Patent 1,618,370 there is described a process for the preparation of non-hygroscopic seed disinfectants containing mercerized phenols associated with an alkaline earth metal oxide or hydroxide, and an alkali metal carbonate. I have now found that in place of the alkali metal carbonate I may use a non-alkaline alkali metal salt, provided it be the salt of an acid which forms, with the alkaline earth oxide or hydroxide, a salt less soluble than said oxide or hydroxide.

The following examples are given by way of illustration but it is to be understood that my invention is not to be limited thereto as other embodiments will be obvious therefrom.

Example I 30 parts of o-chlorphenol mercury sulfate are intimately mixed with 20 parts of hydrated lime and 50 parts of sodium oxalate. This product is then suitable for use as a disinfectant for seeds and the like, either as a dust or in water.

When this product is treated with water the sodium oxalate reacts with the hydrated lime to produce insoluble calcium oxalate and sodium hydroxide, the latter reacting at once with the o-chlorphenol mercury compound to form the soluble sodium salt thereof.

Example II 10 parts of oxy-mercuri-benzoic-acid-anhydride are mixed with 10 parts of magnesium hydroxide and 80 parts of sodium fluoride.

Example III 20 parts of cresol mercury sulfate are mixed with 20 parts of barium oxide and 60 parts of potassium sulfate. The cresol may be either one of the three isomers or the cresol mercury may be prepared by mercurizing technical cresol.

Example IV 30 parts of o-nitrophenol mercury are mixed with 20 parts of calcium oxide and 50 parts of sodium phosphate.

In place of the oxides or hydroxides of such metals as calcium, magnesium, and barium, it is also possible to use compounds such as aluminum hydroxide or oxide.

The alkali metal salts may be either sodium or potassium salts, and include such salts as the oxalate, fluoride, phosphate, sulfate, or, in general, the salts of any acid that will form, with the particular alkaline earth, insoluble compounds.

In place of the mercurized phenols or cresols, it is also possible to use any insoluble organic mercury compound that forms a soluble salt with alkali metal hydroxides, such for example as mercurized carboxylic acids or mercurized sulfonic acids.

The compositions may of course be made up in widely varying proportions of the different ingredients and may be mixed in any way desired. Obviously it is of advantage to have the compositions in finely divided form.

By the term "alkaline earth" as used herein, I mean to include the oxides and hydroxides of calcium, barium, strontium and magnesium.

Where, in the claims, I use the phrase "an insoluble salt with said alkaline earth", I mean a salt less soluble than the alkaline earth itself.

As many apparently widely different embodiments of this invention may be made without departing from the spirit thereof, it is to be understood that I do not intend to limit myself to the specific embodiments thereof except as indicated in the appended claims.

I claim:

1. A disinfectant composition, comprising an insoluble organic mercury compound that forms soluble salts with alkali metal hydroxides, an alkaline earth, and a neutral alkali metal salt of an acid that forms a relatively insoluble salt with said alkaline earth.

2. A disinfectant composition, for the control of seed and plant diseases, comprising an insoluble organic mercury compound that forms soluble salts with alkali metal hydroxides, an alkaline earth, and a neutral alkali metal salt of an acid that forms a relatively insoluble salt with said alkaline earth.

3. A disinfectant composition, comprising a mercurized phenolic compound, an alkaline earth, and a neutral alkali metal salt of an acid that forms a relatively insoluble salt with said alkaline earth.

4. A disinfectant composition, for the control of seed and plant diseases, comprising a mercurized phenolic compound, an alkaline earth, and a neutral alkali metal salt of an acid that forms a relatively insoluble salt with said alkaline earth.

5. A disinfectant composition, comprising mercurized phenols, an alkaline earth, and a neutral alkali metal salt of an acid that forms a relatively insoluble salt with said alkaline earth.

6. A disinfectant composition, for the control of seed and plant diseases, comprising a mercurized phenol, an alkaline earth, and a neutral alkali metal salt of an acid that forms a relatively insoluble salt with said alkaline earth.

7. A disinfectant composition, comprising a mercurized chlorphenol, an alkaline earth, and a neutral alkali metal salt of an acid that forms a relatively insoluble salt with said alkaline earth.

8. A disinfectant composition, for the control of seed and plant diseases, comprising a mercurized chlorphenol, an alkaline earth, and a neutral alkali metal salt of an acid that forms a relatively insoluble salt with said alkaline earth.

9. A disinfectant composition, comprising an insoluble organic mercury compound that forms soluble salts with alkali metal hydroxides, hydrated lime, and a neutral alkali metal salt of an acid that forms a relatively insoluble salt with said hydrated lime.

10. A disinfectant composition, for the control of seed and plant diseases, comprising an insoluble organic mercury compound that forms soluble salts with alkali metal hydroxides, hydrated lime, and neutral alkali metal salt of an acid that forms a relatively insoluble salt with said hydrated lime.

11. A disinfectant composition, comprising mercurized phenols, hydrated lime, and a neutral alkali metal salt of an acid that forms a relatively insoluble salt with said hydrated lime.

12. A disinfectant composition, for the control of seed and plant diseases, comprising a mercurized chlorphenol, hydrated lime, and a neutral alkali metal salt of an acid that forms a relatively insoluble salt with said hydrated lime.

13. A disinfectant composition, comprising mercurized phenols, hydrated lime, and sodium fluoride.

14. A disinfectant composition, for the control of seed and plant diseases, comprising a mercurized chlorphenol, hydrated lime, and sodium fluoride.

In testimony whereof, I affix my signature.

MAX ENGELMANN.